Feb. 27, 1923.
N. M. HAMER
1,447,021
TANK VALVE LOCK
Filed Mar. 31, 1921
2 sheets-sheet 1
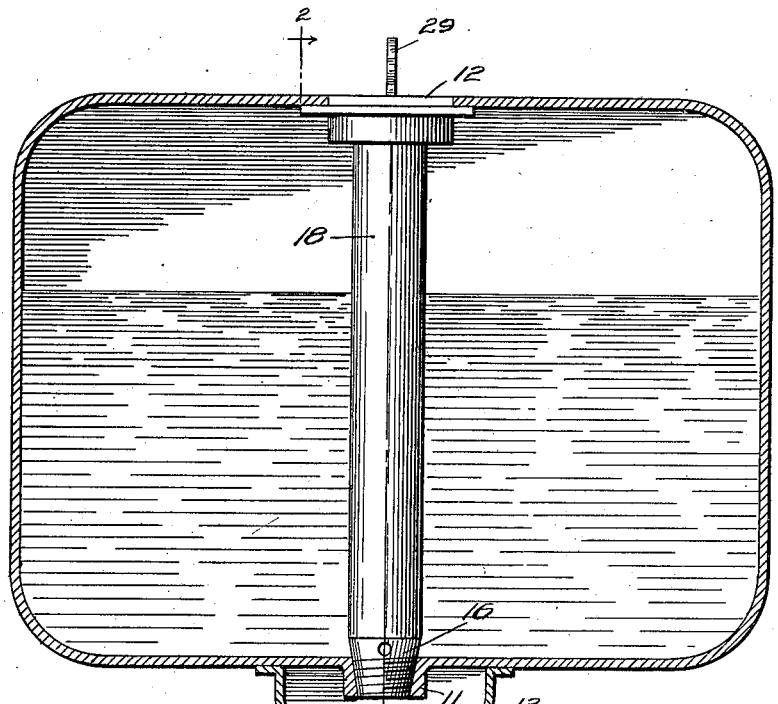
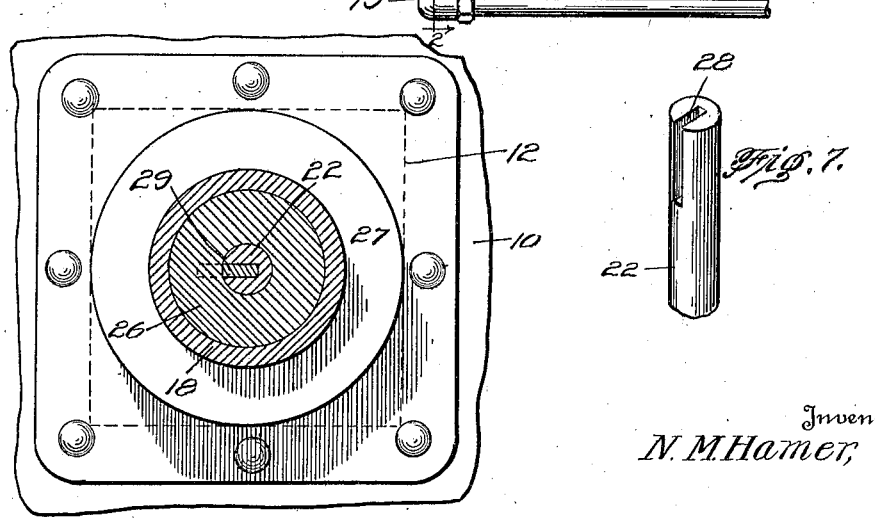
Inventor
N. M. Hamer,
By Geo. P. Kimmel
Attorney

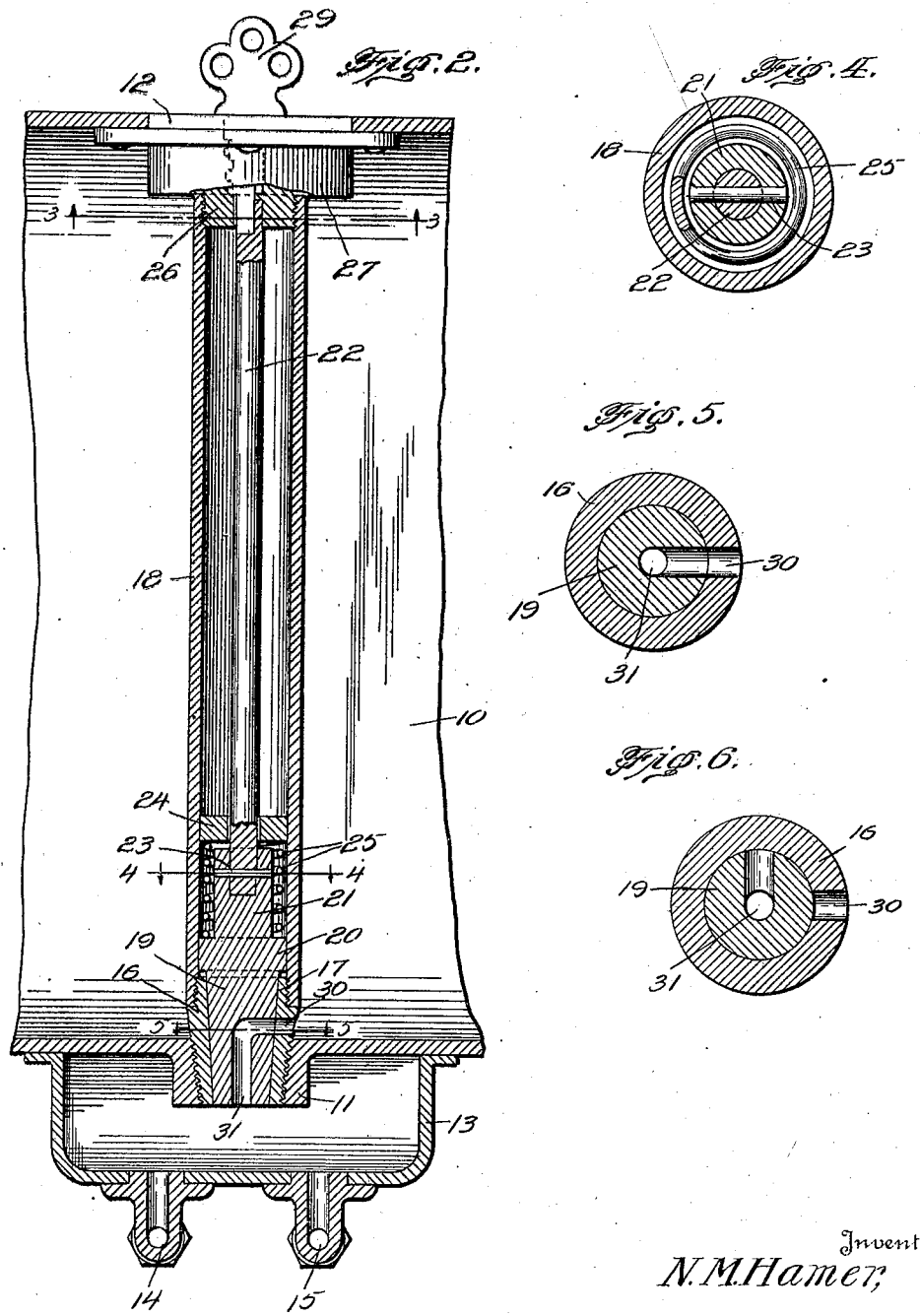

Patented Feb. 27, 1923.

1,447,021

UNITED STATES PATENT OFFICE.

NOAH M. HAMER, OF CHICAGO, ILLINOIS.

TANK-VALVE LOCK.

Application filed March 31, 1921. Serial No. 457,287.

*To all whom it may concern:*

Be it known that I, NOAH M. HAMER, a citizen of the United States, residing at Chicago, in the county of Cook and State of Illinois, have invented certain new and useful Improvements in Tank-Valve Locks, of which the following is a specification.

The invention relates to improvements in fuel feeding tanks for automobiles, and more particularly to a type of the same embodying a locking means for the control valve of such tanks.

The principal object of the invention is to provide a locking means of the character mentioned, and one wherein the cutoff valve may be securely locked in its "off" position whereby to prevent the flow of gas to the carbureter of an automobile during an attempted, unauthorized use of the latter.

Another object of the invention is to provide for a locking cutoff valve mechanism for tanks of the type specified, and one wherein the parts of the mechanism are so arranged within the tank that all possible chance for the disarrangement and removal of the same for effecting a flow of fuel to the carbureter of an automobile for the unauthorized use or theft thereof is eliminated.

With the foregoing and other objects in view, the invention resides in the certain novel and useful construction and arrangement of parts as will be hereinafter more fully described, set forth in the appended claim, and illustrated in the accompanying drawing, in which:—

Figure 1 is a vertical transverse section of a gas tank of an automobile showing one form of the invention embodied therewith.

Fig. 2 is an enlarged fragmentary section taken on the line 2—2 of Fig. 1 and showing the preferred form of the valve locking mechanism as assembled and arranged, the valve being open for the flow of gas from the tank, Fig. 3 is a fragmentary detail of the top wall of the tank with the lock per se positioned thereon, the same being taken on the line 3—3 of Fig. 2 looking in the direction of the arrows, Fig. 4 is a horizontal section taken on the line 4—4 of Fig. 2, Fig. 5 is a horizontal section taken on the line 5—5 of Fig. 2, and showing the valve in operative position, Fig. 6 is a view similar to that of Fig. 5, but showing the valve in its inoperative position, and, Fig. 7 is a perspective view of the upper end of the valve operating rod or stem showing the key guiding slot therein.

Referring to the drawing, wherein similar characters of reference designate corresponding parts in the several views thereof, the numeral 10 indicates a conventional form of gas tank for an automobile which is otherwise slightly modified to provide an outwardly flanged outlet 11 opening centrally through the bottom wall and a substantially square opening 12 in its top wall in alignment with the outlet 11. Inclosing the flanged outlet 11 is a casing 13 secured in position to the lower face of the bottom wall of the tank 10 and forming therewith a closed chamber or trap for distributing the fuel gas to the outlet ports 14 and 15 leading out of the bottom wall of the casing 13.

The flanged outlet 11 has a downwardly opening tapered or substantially conical bore which is threaded to receive the correspondingly tapered or conical portion of a removable valve seat 16, the upper end of the latter being formed with an inset annular flange 17 which is exteriorly threaded to receive thereon the lower end of a safety pipe or sleeve 18 for inclosing the operating means for the valve and keeping the same free from the contents of the tank.

Mounted in the downwardly tapering and substantially conical bore of the removable valve seat 16 is a valve body having a lower active portion 19 within the valve seat, an intermediate annular enlargement 20 closely fitting the opposed wall of the pipe or sleeve 18, and a cylindrical upper portion 21 of a less diameter than the portion 20. The upper end of the cylindrical portion 21 is formed in a circular bore to provide a socket for the reception of the lower end of an operating rod or stem 22, which is removably secured therein by means of a cotter pin or other suitable fastening device 23. Secured within the sleeve 18 at a point immediately above the opposed end of the cylindrical portion 21 of the valve body is an annular collar or ring 24, and interposed between the lower face of the same and the upper face of the annular enlargement 20 of the valve body is a coiled spring 25 which surrounds the cylindrical portion 21. The upper end portion of the rod or stem 22 passes through the central bore of a screw plug 26, which is threaded into the upper end of the pipe or sleeve 18 and forms a part of a lock casing 27, the upper end of the rod or stem 22 also passing through the latter so as to have its free end face disposed flush in the plane of the top face thereof. This lock 27 may be of any known form of key locks suitable for the purpose, such as a "Yale" or "Corbin" type, and the casing of the same is secured, as by riveting, to the under face of the top wall of the tank, so as to inclose the opening 12 formed in the latter. The upper end of the rod or stem 22 is slotted, as at 28, for the insertion of a key 29 into the same, when moved into registry with the complemental key slot of the lock casing, as usual in effecting the locking and unlocking operation.

Opening radially of the wall of the valve seat 16 and inwardly of the tank 10 is an outlet portion 30 which is adapted to be registered by radially extending upper portion of an angularly arranged duct 31 in the lower portion 19 of the valve body, when the valve rod or stem 22 is manipulated for the rotation of the same, the radially extending portion of the duct 31 being a continuation of the vertically extending portion which opens at its lower end centrally through the bottom face of the portion 19 whereby to discharge the fuel gas from the tank to a central point within the trap housing 13.

In the use of a tank embodying the valve and its locking mechanism as contemplated for in the invention, the valve is normally locked in its "off" position, the duct 31 of the valve body having its inlet port moved to a quarter turn position out of registry with the outlet port 30 of the valve seat 16, as shown in Fig. 6. When the owner or authorized operator of the automobile, on which the tank is carried, desires to start on a trip, the key 29 is inserted into the registering slots 28 and 28' of the valve rod or stem 22 and the lock casing 27, and is manipulated therein to turn the rod or stem 22 for the rotation of the valve body a quarter turn, or other sufficient turning movement as is necessary to bring the inlet port of the duct 31 into registry with the outlet port 30 of the valve seat 19, when gas will flow from the tank 10 into the trap housing 13, where it will be distributed to the fuel system connections 14 and 15. Upon making a stop for long periods of time, and to otherwise prevent the theft or unauthorized use of the automobile during his absence, the operator of the automobile will turn the key 29 in the lock, rotate the stem 22 and the valve 19 so that the duct 31 of the same assumes a position out of registry with the outlet port 30, thus cutting off the flow of gas from the tank 10 to the trap housing 13, and consequently to the fuel system connected thereto, the key 29 being afterwards withdrawn from the lock, whereby the automobile will be rendered incapable of traveling an appreciable distance under its own power, upon its attempted unauthorized operation, before the said surplus gas in the system will be consumed, so that the automobile of itself will come to a standstill, and can only be moved from such position as by unlocking the valve for the further flow of fuel gas into the fuel system or by towage.

Having this fully described the invention, what is claimed is:—

The combination with a fuel tank having an opening in its top and in its bottom formed with a boss provided with a conical-shaped bore extending therethrough, of a conical valve seat secured with said bore and formed with a conical-shaped opening extending therethrough and further provided with a reduced threaded inner end, a conical valve body having its lower portion positioned in said seat and having an enlarged intermediate portion, said valve seat having an opening in the wall thereof communicating with said tank, said valve body being formed with an angularly disposed passageway opening at the lower end of the body and communicating with the opening in the valve seat, a locking device mounted in the opening in said top, a tubular member secured at its upper end to said locking device and at its lower end to the threaded inner end of the valve seat, an operating rod extended from said locking device and connected to said valve body, a collar secured in said casing and through which said rod extends, and a coiled spring interposed between said enlarged portion and said collar and surrounding the upper portion of the valve body.

In testimony whereof, I affix my signature hereto.

NOAH M. HAMER.